(12) United States Patent
Yang (10) Patent No.: US 8,965,399 B2
(45) Date of Patent: Feb. 24, 2015

(54) TRACKING AREA UPDATE METHOD AND SYSTEM

(75) Inventor: Kun Yang, Shenzhen (CN)

(73) Assignee: ZTE Corporation, Shenzhen, Guangdong Province (CN)

( * ) Notice: Subject to any disclaimer, the term of this patent is extended or adjusted under 35 U.S.C. 154(b) by 0 days.

(21) Appl. No.: 13/636,334

(22) PCT Filed: Nov. 21, 2011

(86) PCT No.: PCT/CN2011/082547
§ 371 (c)(1),
(2), (4) Date: Sep. 20, 2012

(87) PCT Pub. No.: WO2012/151925
PCT Pub. Date: Nov. 15, 2012

(65) Prior Publication Data
US 2014/0221001 A1    Aug. 7, 2014

(30) Foreign Application Priority Data
Sep. 30, 2011    (CN) .......................... 2011 1 0298008

(51) Int. Cl.
*H04W 24/00* (2009.01)
*H04M 11/04* (2006.01)
*H04W 8/08* (2009.01)
(Continued)

(52) U.S. Cl.
CPC ................ *H04W 8/08* (2013.01); *H04W 60/02* (2013.01); *H04W 4/023* (2013.01); *H04W 28/06* (2013.01)
USPC ..................................... 455/456.1; 455/404.2

(58) Field of Classification Search
USPC ............ 370/329, 328; 455/435.1, 404.1, 445, 455/456.1, 404.2, 68, 418
See application file for complete search history.

(56) References Cited

U.S. PATENT DOCUMENTS

2010/0061331 A1*   3/2010   Guo et al. ...................... 370/329

FOREIGN PATENT DOCUMENTS

| CN | 101977416 A | 2/2011 |
|----|-------------|--------|
| CN | 102123375 A | 7/2011 |
| WO | 2011082538 A1 | 7/2011 |

OTHER PUBLICATIONS

International Search Report for PCT/CN2011/082547 dated Jun. 15, 2012.

(Continued)

*Primary Examiner* — Kiet Doan
(74) *Attorney, Agent, or Firm* — Ling Wu; Stephen Yang; Ling and Yang Intellectual Property (57) ABSTRACT

The present invention discloses a method of tracking area update (TAU), including: when a terminal is not a pre-assigned group representative terminal of a terminal group, deactivating a periodic TAU timer of the terminal; after the terminal enters an idle state and when a mobile reachable timer corresponding to the terminal expires, a network side detecting that a paging proceed flag (PPF) of the group representative terminal of a local terminal group to which the terminal belongs is not cleared, then resetting and restarting the mobile reachable timer corresponding to the terminal. Correspondingly, the present invention also discloses a system of TAU, which realizes the periodic TAU for the terminal group, and reduces the signaling interaction required during implementing the periodic TAU by each terminal in the terminal group and the network side, thus saving the signaling resources and improving the efficiency that the terminal group performs the periodic TAU.

13 Claims, 3 Drawing Sheets

(51) Int. Cl.
*H04W 60/02* (2009.01)
*H04W 4/02* (2009.01)
*H04W 28/06* (2009.01)

(56) References Cited

OTHER PUBLICATIONS

"TAU optimization for MTC devices"; Samsung: C1: NIMTC: Sep. 30, 2010: F: Rel 10: 3GPP TSG-CT WG1 Meeting#67; Barcelona, Spain, Oct. 11-15, 2010; C1-104028; C1103128: see pp. 1-4.

Study on Enhancements for MTC; 3rd Generation Partnership Project; Technical Specification Group Services and System Aspects; Release 11; 3GPP TSG-SA WG1 Meeting #54; Xi'an China, May 9-13, 2011; S1-111319; see pp. 1-22.

"System Improvements for Machine-Type Communications"; 3rd Generation Partnership Project, Technical Specification Group Services and System Aspects; ; Release 11; 3GPP TR 23.888 V1.4.0 Aug. 2011; the whole document.

* cited by examiner

TRACKING AREA UPDATE METHOD AND SYSTEM

TECHNICAL FIELD

The present invention relates to the machine type communication (MTC) technology, and in particular, to a method and system of tracking area update.

BACKGROUND OF THE RELATED ART

Figure 1:
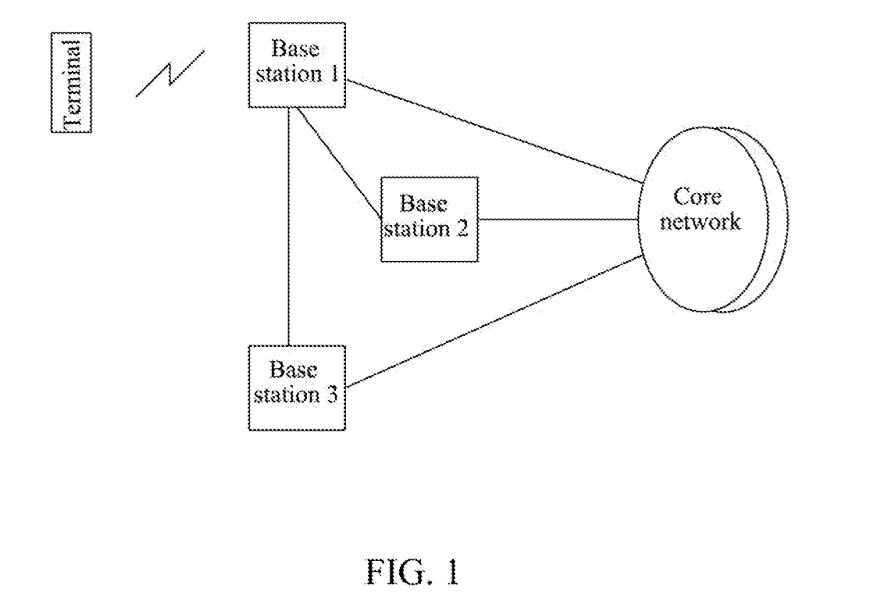
FIG. 1 is a composition structure diagram of an existing cellular wireless communication system.

The cellular wireless communication system is mainly composed of a core network (CN), a radio access network (RAN) and a terminal. The core network is responsible for the non-access layer affairs, such as, the terminal location update, etc., and it is an anchor point of the user plane. The access network includes a base station, or a base station and a base station controller, and the access network is responsible for the access layer affairs (such as, the management of the radio Resource, etc.). There can be a physical or logical connection between the base stations according to the actual conditions. The cellular wireless communication system shown in FIG. 1 includes the core network, the base station 1, the base station 2, the base station 3 and the terminal. Wherein, the base station 1 connects with the base station 2, the base station 3 connects with the base station 1, and each base station can connect with one or more core network nodes in the core network. The terminal is precisely a user equipment (UE), referring to various equipments which can communicate with the cellular wireless communication network, such as mobile phones, notebook computers, etc., and the terminal accesses the core network through the base station.

The MTC service is precisely a machine type communication service. There is no need of the people participation in the MTC service, and all communication is finished by the machine initiatively. Specifically, in the MTC service, the MTC terminal obtains the data through the perception equipment such as, sensor, etc., and the data are managed by a particular server of the mobile operator or a specialized MTC operator, available to the MTC user or the MTC administrator. Then the MTC terminal reports the data to the mobile communication network, and accesses the public data network through the mobile communication network, for example, the applications, such as, the logistic monitoring, security monitoring, remote medical treatment detection, remote meter reading, etc.

The MTC service has introduced the characteristic different from the traditional mobile communication, such as the MTC characteristic based on group. When the MTC characteristic based on group is activated, the network can control, manage or charge the MTC terminals in group according to the demand of the operator. Like this, the group-based MTC characteristic regards group as the granularity and provides simpler and easier mode to control/update/charge the MTC terminals, and reduces the redundant signaling in order to avoid the network congestion. When the quantity of the MTC terminals is very large, it can also save the network resource by using the MTC characteristic based on group. Each terminal within one group can be in the same area, and/or possess the same MTC characteristics attribute, and/or belong to the same MTC users; and in terms of network, each terminal in the group is visible.

As to the MTC characteristic based on group, when the MTC user signs a contract with one terminal group, the operator needs to set and activate the group characteristic in the signing information of each terminal in the group, and stores it in the home subscriber server (HSS). The HSS is responsible for storing the identity information, authentication information and authorization information, etc., of the user or the terminal. The HSS is further responsible for the signing database of the user and performing the identity authentication and authorization etc., of the user. The service platform can inquire the relevant information of the user or the terminal from the HSS.

When the terminal is attached to the network, the mobility management entity (MME) obtains the signing information of the terminal from the HSS, and stores it locally. The MME is the entity used for managing the terminal control signaling in the core network.

The terminal is usually assigned in one tracking area by the network, when the terminal moves out of the tracking area, it needs to send the tracking area update (TAU) request to the network side, so that the network side modifies the tracking area location information of the terminal locally. When the terminal does not move and in an idle state, the terminal also needs to perform the periodic TAU process, that is: within one period, the terminal sends the TAU request to the network side, the network side monitors that the terminal is online through the mobile reachable timer, and then returns the TAU acceptation message to the terminal, and the next period is entered.

After introducing the MTC characteristic based on group, the current network function is unable to control the periodic TAU of the terminal group according to the signed group information.

CONTENT OF THE INVENTION

On that basis, the main objective of the present invention is to provide a method and system of tracking area update, which can realize the periodic TAU control for the terminal group.

In order to achieve the above-mentioned objective, the technical scheme of the present invention is implemented like this:

the present invention provides a method of tracking area update, comprising:

when a terminal is not a pre-assigned group representative terminal of a terminal group, deactivating a periodic TAU timer of the terminal; and after the terminal enters an idle state and when a mobile reachable timer corresponding to the terminal expires, a network side detecting that a paging proceed flag (PPF) of a group representative terminal of a local terminal group to which the terminal belongs is not cleared, then resetting and restarting the mobile reachable timer corresponding to the terminal.

In the above scheme, before deactivating a periodic TAU timer of the terminal, the method further comprises: a mobility management entity (MME) obtaining a terminal group management message containing a terminal identification of the terminal and a group representative terminal identification of a terminal group to which the terminal belongs, and judging whether the terminal is the pre-assigned group representative terminal based on the terminal group management message; and if not, then sending a periodic TAU timer deactivation indication to the terminal; if yes, then sending a time value of the periodic TAU timer to the terminal, or not sending any indication relevant to the periodic TAU timer to the terminal.

In the above scheme, the step of sending a periodic TAU timer deactivation indication to the terminal is sending the periodic TAU timer deactivation indication to the terminal through an attachment acceptation message or a TAU acceptation message.

In the above scheme, the step of a MME obtaining a terminal group management message containing a terminal identification of the terminal and a group representative terminal identification of a terminal group to which the terminal belongs comprises: the MME obtaining the terminal group management message from a home subscriber server (HSS); or, the MME obtaining the terminal group management message through an old MME of the terminal.

In the above scheme, after sending a time value of the periodic TAU timer to the terminal, or not sending any indication relevant to the periodic TAU timer to the terminal, further comprising: the terminal setting a time value of a local periodic TAU timer as a default value or a time value of a periodic TAU timer sent by the MME; and after the terminal enters the idle state, the terminal triggering a periodic TAU process, and sending a periodic TAU request to the MME under control of a local periodic TAU timer.

In the above scheme, before deactivating a periodic TAU timer of the terminal, further comprising: the network side pre-assigning one terminal in the terminal group as the group representative terminal of the terminal group, and regarding the terminal identification of the terminal as the group representative terminal identification of the terminal group.

In the above scheme, after the terminal enters an idle state and when a mobile reachable timer corresponding to the terminal expires, further comprising: the network side detecting that the PPF of the group representative terminal of the local terminal group to which the terminal belongs is already cleared, then clearing the PPF corresponding to the terminal locally, and starting an implicit detach timer corresponding to the terminal.

The present invention also provides a system of tracking area update (TAU), comprising: a network side equipment and a terminal being not a pre-assigned group representative terminal of a terminal group, wherein, the network side equipment comprises a deactivation unit and an adjustment unit, wherein, the deactivation unit is used to deactivate a periodic TAU timer of the terminal; and the adjustment unit is used to, after the terminal enters an idle state and when a mobile reachable timer corresponding to the terminal expires, detect that a paging proceed flag (PPF) of the group representative terminal of a local terminal group to which the terminal belongs is not cleared, then reset and restart the mobile reachable timer corresponding to the terminal.

In the above scheme, the adjustment unit is further used to, after detecting that the PPF of the group representative terminal of the local terminal group to which the terminal belongs is already cleared, then clear the PPF corresponding to the terminal locally, and start an implicit detach timer corresponding to the terminal.

In the above scheme, the network side equipment further comprises: a acquisition unit, a judgment unit and an activation unit, wherein, the acquisition unit is used to obtain a terminal group management message containing a terminal identification of the terminal and a group representative terminal identification of a terminal group to which the terminal belongs; the judgment unit is used to judge whether the terminal is the pre-assigned group representative terminal based on the terminal group management message obtained by the acquisition unit; if not, then notify the deactivation unit, if yes, then notify the activation unit; the activation unit is used to send a time value of a periodic TAU timer to the terminal, or not to send any indication relevant to the periodic TAU timer to the terminal after receiving the notification of the judgment unit; and the deactivation unit is further used to send a periodic TAU timer deactivation indication to the terminal after receiving the notification of the judgment unit.

In the above scheme, the system further comprises: a terminal, taken as the group representative terminal of the terminal group, used to set a time value of a local periodic TAU timer as a default value or a time value of a periodic TAU timer sent by the activation unit.

In the above scheme, the network side equipment further comprises: an assignment unit, used to pre-assign one terminal in the terminal group as the group representative terminal of the terminal group, and regard the terminal identification of the terminal as the group representative terminal identification of the terminal group.

In the above scheme, the network side equipment comprise a mobility management entity (MME), and the deactivation unit, the adjustment unit, the acquisition unit, the judgment unit, the activation unit and the assignment unit are all comprised in the MME; or, the network side equipment comprises a home subscriber server (HSS) and an MME, the deactivation unit, the adjustment unit, the acquisition unit, the judgment unit, and the activation unit are all comprised in the MME, and the assignment unit is comprised in the HSS.

In the method and system of tracking area update of the present invention, when the terminal is not the pre-assigned group representative terminal of the terminal group, the periodic TAU timer of the terminal is deactivated directly, the network side, based on the paging proceed flag (PPF) of the group representative terminal of the terminal group to which the terminal belongs, resets and restarts the mobile reachable timer of the terminal, thereby, except the group representative terminal in the terminal group, other terminals do not need to initiate the periodic TAU process after entering the idle state, and the network side can also monitor whether the terminal is online, which realizes the periodic TAU process of the terminal group, and reduces the signaling interaction required in the process of implementing the periodic TAU process by each terminal in the terminal group and the network side, thus saving the signaling resources and improving the efficiency that the terminal group performs the periodic TAU.

PREFERRED EMBODIMENTS OF THE PRESENT INVENTION

The basic idea of the present invention is: combining the MTC characteristic based on group with the tracking area update of the existing single terminal to implement the tracking area update for the terminal group.

Figure 2:
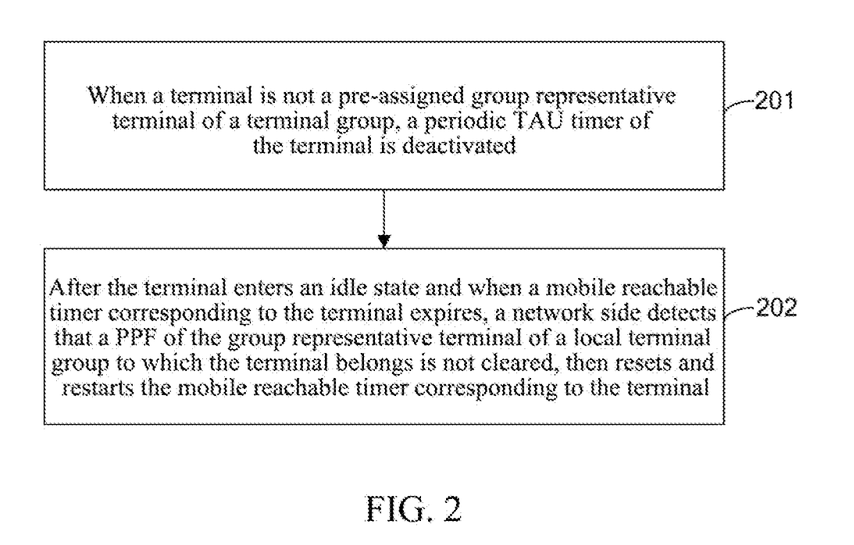
FIG. 2 is an implementation flow chart of a method of tracking area update.

The tracking area update method of the present invention, as shown in FIG. 2, may mainly include the following steps:

in step 201: when a terminal is not a group representative terminal of a pre-assigned terminal group, a periodic TAU timer (T3412) of the terminal is activated;

in step 202: after the terminal enters an idle state and when a mobile reachable timer corresponding to the terminal expires, a network side detects that a paging proceed flag (PPF) of the group representative terminal of a local terminal group to which the terminal belongs is not cleared, then resets and restarts the mobile reachable timer corresponding to the terminal.

Here, after the terminal enters an idle state and when a mobile reachable timer corresponding to the terminal expires, the method further includes: the network side detecting that the PPF of the group representative terminal of the local terminal group to which the terminal belongs is already cleared, then clearing the PPF corresponding to the terminal locally, and starting an implicit detach timer corresponding to the terminal.

Wherein, in step 201, before deactivating a periodic TAU timer of the terminal, the method further includes: a mobility management entity (MME) obtaining a terminal group management message containing a terminal identification of the terminal and a group representative terminal identification of a belonged terminal group, and based on the terminal group management message, judging whether the terminal is the pre-assigned group representative terminal; if not, then sending a periodic TAU timer deactivation indication to the terminal; if yes, then sending a time value of the periodic TAU timer to the terminal, or not sending any indication relevant to the periodic TAU timer to the terminal.

Here, the MME can obtain the terminal group management message from a home subscriber server (HSS); or, the MME obtains the terminal group management message through an old MME of the terminal.

Here, after sending a time value of the periodic TAU timer to the terminal, or not sending any indication relevant to the periodic TAU timer to the terminal, the method further includes: the terminal setting a time value of a local periodic TAU timer as a default value or a time value of a periodic TAU timer sent by the MME; and after the terminal enters the idle state, the terminal triggering a periodic TAU process, and sending a periodic TAU request to the MME under the control of a local periodic TAU timer.

Here, before deactivating a periodic TAU timer of the terminal, the method further includes: the network side pre-assigning one terminal in the terminal group as the group representative terminal of the terminal group, and regarding the terminal identification of the terminal as the group representative terminal identification of the terminal group. In addition, the group representative terminal identification can be stored into the signing data of each terminal in the terminal group.

In practical application, the way of assigning the representative terminal of the terminal group may be: assigning a terminal in the terminal group as the group representative terminal by negotiation between the user terminal and the server of the operator; or, determining a determination rule for determining the group representative terminal by negotiation between the user terminal and the operator, and when each terminal in the terminal group joins the network subsequently, assigning the corresponding terminal of the terminal group as the group representative terminal by the network side HSS or MME according to the determination rule. For example, the determination rule of the group representative terminal may be taking the first terminal attached to the network in the terminal group as the group representative terminal of the terminal group.

Correspondingly, the present invention further provides a system for updating tracking area, including: a network side equipment and a terminal which is not a pre-assigned group representative terminal of a terminal group, wherein, the network side equipment includes a deactivation unit and an adjustment unit, wherein, the deactivation unit is used to deactivate a periodic TAU timer of the terminal; and the adjustment unit is used to, after the terminal enters an idle state and when a mobile reachable timer corresponding to the terminal expires, detect that a paging proceed flag (PPF) of the group representative terminal of a local terminal group to which the terminal belongs is not cleared, then reset and restart the mobile reachable timer corresponding to the terminal.

Wherein, the adjustment unit is further used to, after detecting that the PPF of the group representative terminal of a local terminal group to which the terminal belongs is already cleared, clear the PPF corresponding to the terminal locally, and start an implicit detach timer corresponding to the terminal.

Wherein, the network side equipment further includes: an acquisition unit, a judgment unit and an activation unit, wherein, the acquisition unit is used to acquire a terminal group management message containing a terminal identification of the terminal and a group representative terminal identification of a belonged terminal group; the judgment unit is used to judge whether the terminal is the pre-assigned group representative terminal based on the terminal group management message acquired by the acquisition unit; if not, then notify the deactivation unit, if yes, then notify the activation unit; the activation unit is used to send a time value of a periodic TAU timer to the terminal, or not to send any indication relevant to the periodic TAU timer to the terminal after receiving the notification of the judgment unit; and the deactivation unit is further used to send a periodic TAU timer deactivation indication to the terminal after receiving the notification of the judgment unit.

Here, the system further includes: a terminal used as the group representative terminal of the terminal group, wherein, the terminal used as the group representative terminal is used to set a time value of a local periodic TAU timer as a default value or a time value of a periodic TAU timer sent by the activation unit.

Wherein, the network side equipment may further include: an assignment unit, used to pre-assign a terminal in the terminal group as the group representative terminal of the terminal group, and regard the terminal identification of the terminal as the group representative terminal identification of the terminal group. Here, the network side equipment may also store the group representative terminal identification into the signing data of each terminal in the terminal group, so that each terminal can use the group representative terminal identification directly when performing the tracking area update.

In practical application, the network side equipment may comprise a mobility management entity (MME), and the deactivation unit, the adjustment unit, the acquisition unit, the judgment unit, the activation unit and the assignment unit are all contained in the MME; or, the network side equipment may comprise a home subscriber server (HSS) and an MME, and the deactivation unit, the adjustment unit, the acquisition unit, the judgment unit, and the activation unit are all contained in the MME, and the assignment unit is contained in the HSS.

Embodiment One

Figure 3:
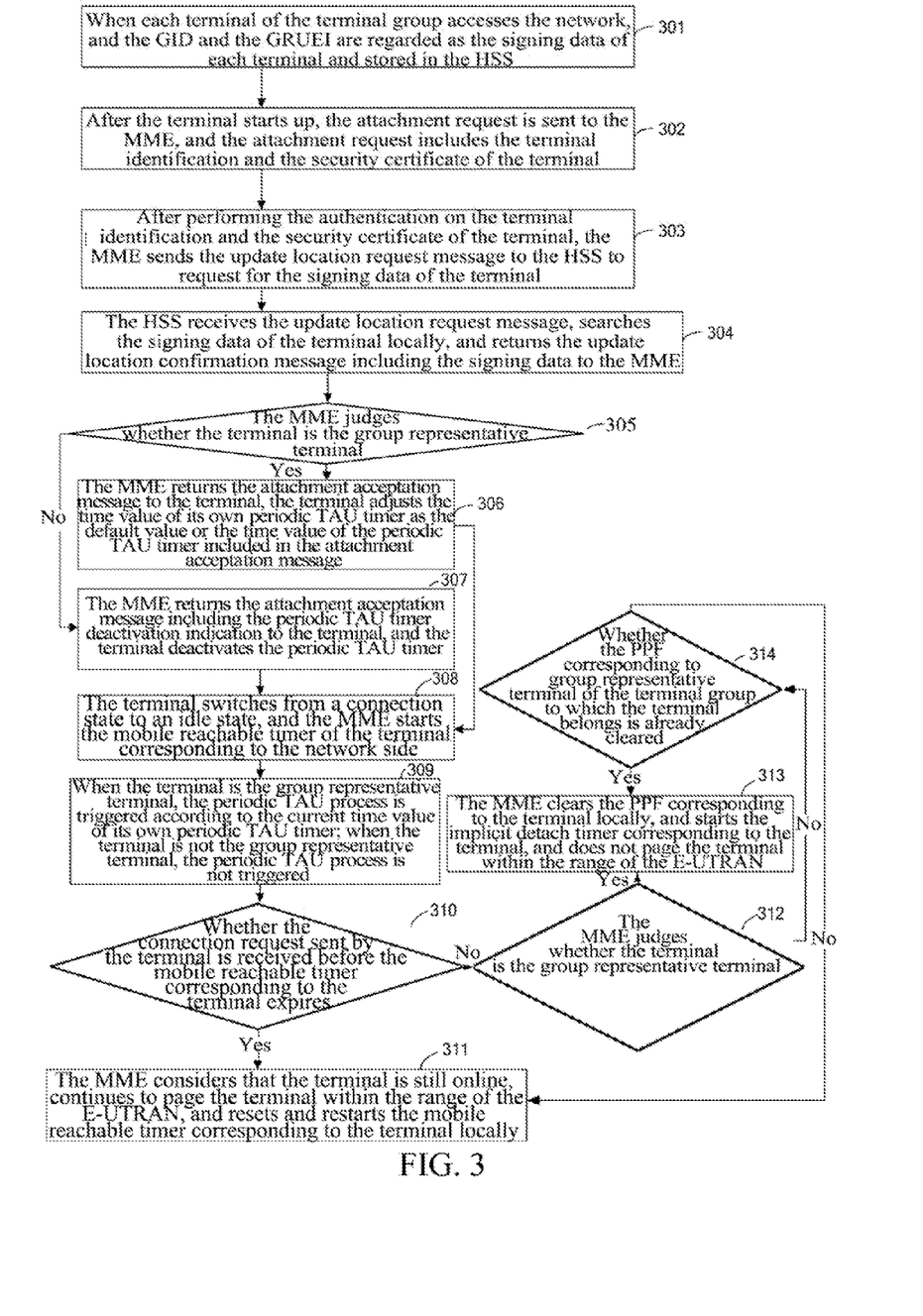
FIG. 3 is a flow chart of performing tracking area update for any terminal in a terminal group according to embodiment one of the present invention.

In the present embodiment, as shown in FIG. 3, the flow of performing the tracking area update for any terminal in the terminal group may specifically include the following steps:

in step 301, when each terminal of the terminal group accesses the network, each terminal is contracted to be the terminal with the group characteristic, a Group Identity (GID) is assigned for the terminal group, one terminal of the terminal group is assigned as the group representative terminal of the terminal group, the terminal identification of the terminal is regarded as the group representative terminal identification (Group Representative UE Identity, GRUEI), and the GID and the GRUEI are taken as the signing data of each terminal and stored in the HSS;

for example, it may be that the first terminal attached to the network in the terminal group is assigned as the group representative terminal of the terminal group, and the terminal identification of the terminal is regarded as GRUEI; or, it may also be that one terminal of the terminal group also is set as the group representative terminal of the terminal group by signing the contract by the MTC user with the operator, the terminal identification of the terminal is regarded as GRUEI, and the GRUEI is stored into the signing data of each terminal. Specifically, the way of assigning the group representative terminal may be determined according to the actual requirement;

in step 302, after starting up, the terminal sends the attachment request to the MME, where the attachment request includes the terminal identification and the security certificate of the terminal;

in step 303, after performing the authentication on the terminal identification and the security certificate of the terminal, the MME sends the update location request message to the HSS to request for the signing data of the terminal;

here, the update location request message includes the terminal identification of the terminal, which may be, for example, an international mobile subscriber identification number (IMSI);

in step 304, after receiving the update location request message sent by the MME, the HSS, according to the terminal identification therein, searches out the signing data of the terminal locally, and returns the update location confirmation message including the signing data to the MME;

here, the update location confirmation message includes the terminal group management message, the terminal group management message includes the terminal identification of the terminal, and the GID and the GRUEI of the terminal group to which the terminal belongs; the MME will store the terminal group management message in the update location confirmation message locally after receiving the update location confirmation message of the terminal;

in step 305, the MME receives the update location confirmation message and judges whether the terminal is the group representative terminal, if yes, proceed to step 306, otherwise, proceed to step 307;

specifically, the MME may verify whether the terminal identification of the terminal group management message is identical to the GRUEI, if yes, then the terminal is the group representative terminal, if not, then the terminal is not the group representative terminal;

in step 306, the MME returns the attachment acceptation message to the terminal, the terminal receives the attachment acceptation message and adjusts the time value of its own periodic TAU timer as the default value (such as, 54 minutes) or the time value of the periodic TAU timer included in the attachment acceptation message, and proceed to step 308;

here, the attachment acceptation message may not include the time value of the periodic TAU timer, and may also include the time value of the periodic TAU timer;

specifically, if the attachment acceptation message does not include the time value of the periodic TAU timer, then the terminal adjusts the time value of its own periodic TAU timer to the default value. If the attachment acceptation message includes the time value of the periodic TAU timer, then the terminal adjusts the time value of its own periodic TAU timer to the time value of the periodic TAU timer included in the attachment acceptation message;

in step 307, the MME returns the attachment acceptation message including the periodic TAU timer deactivation indication to the terminal, and the terminal receives the attachment acceptation message and deactivates the periodic TAU timer according to the periodic TAU timer deactivation indication in the attachment acceptation message;

here, the attachment acceptation message may include the terminal signing data at the same time. The terminal may also store the GID in the signing data locally.

Wherein, to deactivate the periodic TAU timer is to set the value of the periodic TAU timer as 0 locally;

in step 308, the terminal switches from a connection state to an idle state, and the MME starts the mobile reachable timer of the terminal corresponding to the network side;

here, after the signaling connection between the terminal and the currently served MME is released or broken off, the terminal enters the idle state;

in step 309, when the terminal is the group representative terminal, the terminal triggers the periodic TAU process according to the current time value of its own periodic TAU timer, and sends the TAU request to the MME periodically; when the terminal is not the group representative terminal, the terminal does not trigger the periodic TAU process;

in step 310, based on whether the MME receives the TAU request sent by the terminal before the mobile reachable timer corresponding to the terminal expires, if yes, proceed to step 311; otherwise, proceed to step 312;

here, the connection request may be the TAU request in step 309, and may also be any other request connected to the MME initiated by the terminal;

in step 311, the MME considers that the terminal is still online, continues to page the terminal within the range of the E-UTRAN, and resets and restarts the mobile reachable timer corresponding to the terminal locally, and the current flow ends;

in step 312, the MME judges whether the terminal is the group representative terminal, if yes, proceed to step 313; otherwise, proceed to step 314;

specifically, the MME verifies whether the terminal identification in the terminal group management message of the terminal stored locally is identical to the GRUEI, if yes, then it is considered that the terminal is the group representative terminal, if not, it is considered that the terminal is not the group representative terminal;

in step 313, the MME clears the PPF corresponding to the terminal locally, and starts the implicit detach timer corresponding to the terminal, and dose not page the terminal within the range of the E-UTRAN, and the current flow ends;

in step 314: the MME, according to the GID and GRUEI of terminal group to which the terminal belongs, searches locally whether the PPF corresponding to group representative terminal of the terminal group to which the terminal belongs is already cleared, if not, return to step 311, otherwise, return to step 313.

In the present embodiment, if the terminal is the first terminal attached to the network, and when the first terminal attached to the network is assigned as the group representative terminal in step 301, then in step 304, the HSS assigns the terminal as the group representative terminal, and regards the terminal identification of the terminal as the GRUEI of the terminal group.

In practical application, when the terminal is activated, the network side will set the PPF for it in its served MME.

Figure 4:
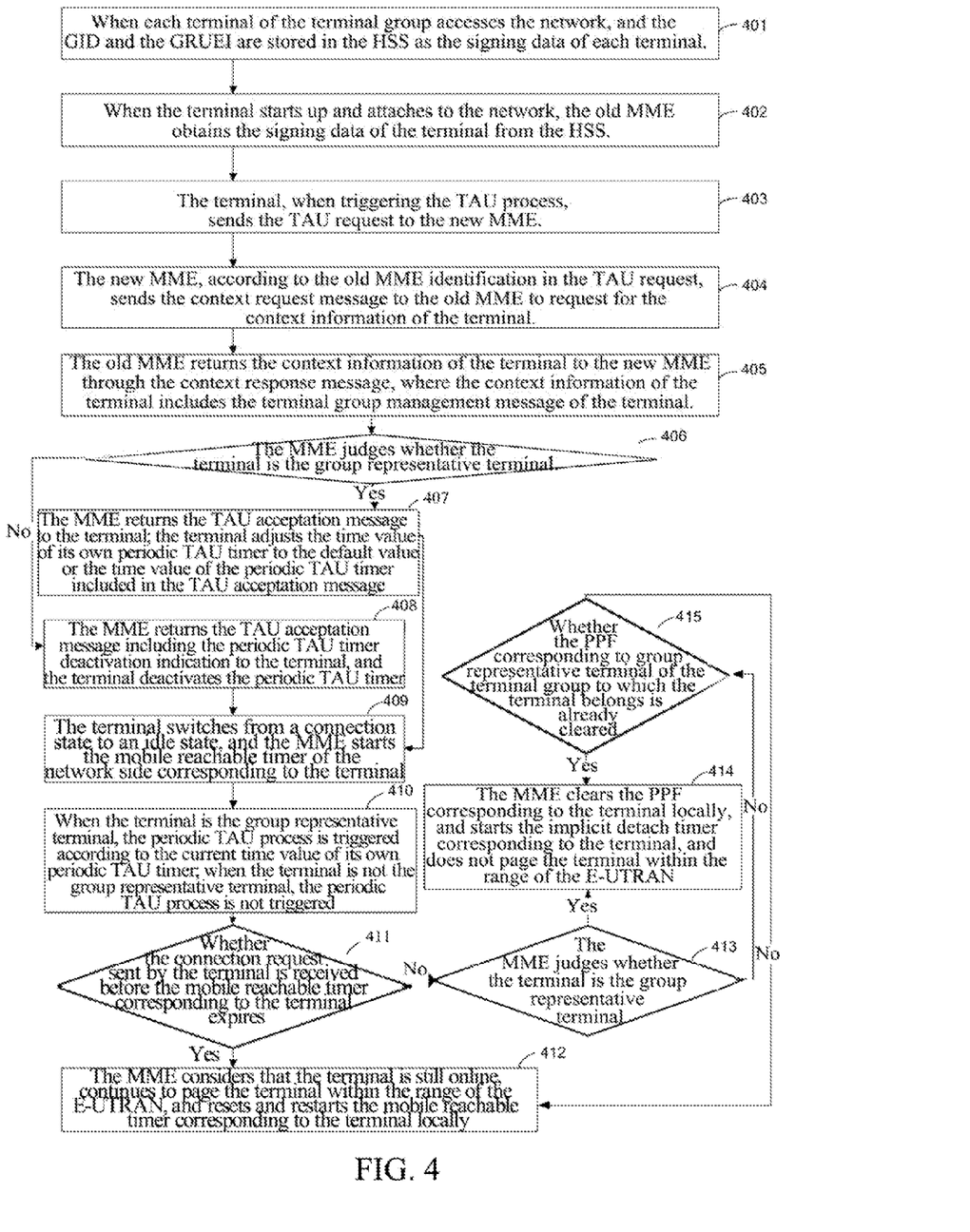
FIG. 4 is a flow chart of performing tracking area update for any terminal in a terminal group according to embodiment two of the present invention.

Embodiment Two in the present embodiment, as shown in FIG. 4, the flow of performing the tracking area update for any terminal in the terminal group may specifically include the following steps:

in step 401, exactly same with step 301;

in step 402, when the terminal starts up and attaches to the network, the old MME obtains the signing data of the terminal from the HSS;

in step 403, the terminal, when triggering the TAU process, sends the TAU request to the new MME, wherein, the TAU request includes the old terminal identification of the terminal (such as, the global unique temporary identification (GUTI)), the old MME identification (such as, the global unique MME identification (GUMMEI)), and the GID of the terminal group to which the terminal belongs;

in step 404, the new MME receives the TAU request sent by the terminal, and sends the context request message to the old MME to request for the context information of the terminal according to the old MME identification in the TAU request, where the context request message includes the old terminal identification of the terminal, the new MME identification, and the GID of the terminal group to which the terminal belongs;

in step 405, the old MME receives the context request message, sends the context response message to the new MME to return the context information of the terminal, where the context information of the terminal includes the terminal group management message of the terminal;

specifically, the terminal group management message includes the terminal identification of the terminal (such as, IMSI), and the GID and the GRUEI of the terminal group to which the terminal belongs;

in step 406, the new MME receives the context response message, obtains the terminal group management message of the terminal and judges whether the terminal is the group representative terminal, if yes, proceed to step 407, otherwise proceed to step 408;

in step 407, the MME returns the TAU acceptance message to the terminal; the terminal receives the TAU acceptance message, and adjusts the time value of its own periodic TAU timer to the default value or the time value of the periodic TAU timer included in the TAU acceptance message; proceed to step 409;

here, the TAU acceptance message may or may not include the time value of the periodic TAU timer;

specifically, if the TAU acceptance message does not include the time value of the periodic TAU timer, then the terminal adjusts the time value of its own periodic TAU timer to the default value; or else, the terminal adjusts the time value of its own periodic TAU timer to the time value of the periodic TAU timer included in the TAU acceptance message;

in step 408, the MME returns the TAU acceptance message including the periodic TAU timer deactivation indication to the terminal, and the terminal receives the TAU acceptance message and deactivates the periodic TAU timer according to the periodic TAU timer deactivation indication in the TAU acceptance message;

here, the TAU acceptance message may include the terminal signing data at the same time; and the terminal may store the GID in the signing data locally; wherein, the deactivating the periodic TAU timer sets the time value of the periodic TAU timer as 0 locally;

step 409—step 415 are totally same with step 308—step 314.

In the present embodiment, if the terminal is the first terminal attached to the network, and the first terminal attached to the network is assigned as the group representative terminal in step 401, then in step 304, firstly the HSS assigns the terminal as the group representative terminal, and regards the terminal identification of the terminal as the GRUEI of the terminal group and stores it; then the old MME obtains the terminal group management message including the GRUEI from the HSS; or, in step 402, after the old MME obtains the terminal signing data, the old MME assigns the terminal as the group representative terminal, and regards the terminal identification of the terminal as the GRUEI of the terminal group and stores it.

The above description is only preferred embodiments of the present invention, and does not intend to limit the protective scope of the present invention.

What is claimed is:

1. A method of tracking area update (TAU), comprising:
when a terminal is not a group representative terminal of a terminal group to which the terminal belongs, deactivating a periodic TAU timer of the terminal; and
after the terminal enters an idle state and when a mobile reachable timer corresponding to the terminal expires, a network side locally detecting that a paging proceed flag (PPF) of the group representative terminal of the terminal group is not cleared, then resetting and restarting the mobile reachable timer corresponding to the terminal.

2. The method according to claim 1, before deactivating a periodic TAU timer of the terminal, further comprising:
a mobility management entity (MME) obtaining a terminal group management message containing a terminal identification of the terminal and a group representative terminal identification of the terminal group to which the terminal belongs, and judging whether the terminal is the group representative terminal based on the terminal group management message; and
if the terminal is not the group representative terminal, then sending a periodic TAU timer deactivation indication to the terminal; if yes, then sending a time value of the periodic TAU timer to the terminal, or not sending any indication relevant to the periodic TAU timer to the terminal.

3. The method according to claim 2, wherein, the step of sending a periodic TAU timer deactivation indication to the terminal is sending the periodic TAU timer deactivation indication to the terminal through an attachment acceptation message or a TAU acceptation message.

4. The method according to claim 2, wherein, the step of a MME obtaining a terminal group management message containing a terminal identification of the terminal and a group representative terminal identification of the terminal group to which the terminal belongs comprises: the MME obtaining the terminal group management message from a home subscriber server (HSS); or, the MME obtaining the terminal group management message through an old MME of the terminal.

5. The method according to claim 2, after sending a time value of the periodic TAU timer to the terminal, or not sending any indication relevant to the periodic TAU timer to the terminal, further comprising:
the terminal locally setting a time value of a periodic TAU timer as a default value or the time value of the periodic TAU timer sent by the MME; and after the terminal enters the idle state, the terminal triggering a periodic TAU process, and sending a periodic TAU request to the MME under control of the periodic TAU timer.

6. The method according to claim 1, before deactivating a periodic TAU timer of the terminal, further comprising: the network side pre-assigning a terminal in the terminal group as the group representative terminal of the terminal group, and regarding the terminal identification of the terminal as the group representative terminal identification of the terminal group.

7. The method according to of claim 1, after the terminal enters an idle state and when a mobile reachable timer corresponding to the terminal expires, further comprising: the network side locally detecting that the PPF of the group representative terminal of the terminal group to which the terminal belongs is already cleared, then clearing the PPF corresponding to the terminal locally, and starting an implicit detach timer corresponding to the terminal.

8. A system of tracking area update (TAU), comprising: a network side equipment and a terminal being not a group representative terminal of a terminal group to which the terminal belongs, wherein, the network side equipment comprises a deactivation unit and an adjustment unit, wherein,
the deactivation unit is used to deactivate a periodic TAU timer of the terminal; and
the adjustment unit is used to, after the terminal enters an idle state and when a mobile reachable timer corresponding to the terminal expires, locally detect that a paging proceed flag (PPF) of the group representative terminal of the terminal group is not cleared, then reset and restart the mobile reachable timer corresponding to the terminal.

9. The system according to claim 8, wherein, the adjustment unit is further used to, after detecting that the PPF of the group representative terminal of the terminal group is already cleared, clear the PPF corresponding to the terminal locally, and start an implicit detach timer corresponding to the terminal.

10. The system according to claim 8, wherein, the network side equipment further comprises: a acquisition unit, a judgment unit and an activation unit, wherein, the acquisition unit is used to obtain a terminal group management message containing a terminal identification of the terminal and a group representative terminal identification of the terminal group to which the terminal belongs;
the judgment unit is used to judge whether the terminal is the group representative terminal based on the terminal group management message obtained by the acquisition unit; if the terminal is not the group representative terminal, then notify the deactivation unit, if yes, then notify the activation unit;
the activation unit is used to send a time value of a periodic TAU timer to the terminal, or not to send any indication relevant to the periodic TAU timer to the terminal after receiving the notification of the judgment unit; and
the deactivation unit is further used to send a periodic TAU timer deactivation indication to the terminal after receiving the notification of the judgment unit.

11. The system according to claim 10, further comprising: a terminal, taken as the group representative terminal of the terminal group, used to locally set a time value of a periodic TAU timer as a default value or the time value of the periodic TAU timer sent by the activation unit.

12. The system according to claim 10, wherein,
the network side equipment further comprises: an assignment unit, used to pre-assign a terminal in the terminal group as the group representative terminal of the terminal group, and regard the terminal identification of the terminal as the group representative terminal identification of the terminal group.

13. The system according to claim 12, wherein,
the network side equipment comprise a mobility management entity (MME), and the deactivation unit, the adjustment unit, the acquisition unit, the judgment unit, the activation unit and the assignment unit are all comprised in the MME;
or, the network side equipment comprises a home subscriber server (HSS) and an MME, the deactivation unit, the adjustment unit, the acquisition unit, the judgment unit, and the activation unit are all comprised in the MME, and the assignment unit is comprised in the HSS.

* * * * *